Nov. 13, 1951  J. W. ANDERSON ET AL  2,574,456
QUICK DISCONNECT COUPLING FOR POWER CABLES
Filed July 8, 1949  2 SHEETS—SHEET 1

INVENTORS
JOHN WALLEN ANDERSON
AND
JEAN WILLARD HAMILTON
BY
Fraser, Myers & Manley
ATTORNEYS INVENTORS
JOHN WALLEN ANDERSON
AND
JEAN WILLARD HAMILTON
BY
Fraser, Myers & Manley
attorneys Patented Nov. 13, 1951

2,574,456

UNITED STATES PATENT OFFICE 2,574,456

QUICK DISCONNECT COUPLING FOR POWER CABLES

John Wallen Anderson, Westfield, and Jean Willard Hamilton, Montclair, N. J., assignors to Airtron, Inc., Linden, N. J., a corporation of New Jersey Application July 8, 1949, Serial No. 103,646

2 Claims. (Cl. 173—328)

This invention relates to a quickly disconnectable connecting device for power cables or the like.

An important object of the invention is the provision of such a device in which the contacts between the connected conducting parts are positive and are firmly locked against unintentional separation or breaking of the connection.

Another important object is the provision of such a device in which the connected cable portions may swivel freely in relation to each other while the connection between the cable portions is positive and is effectually safeguarded against unintended separation.

Another important object is the provision of such a device in which the connected cable portions, although securely locked together against unintentional separation, nevertheless may be quickly separated by simple manipulation or shifting of a single element of the device in one direction.

Another important object is the provision of such a device in which the means for locking a cable end into a connection member are located entirely within the latter so that such cable locking means may not be contacted or released from the exterior of the device, and in which such locking means may be arranged so that the cable end cannot be released except by substantially disassembling the connection member.

Another important object is the provision of such a device having circumferentially contractable means for firmly contracting a somewhat resilient contact sleeve upon a contact finger telescoped therewithin to effect a positive conduction connection between the two.

Another object is the provision of such a device which includes means for assuring that connection will be established only between certain cable leads which are intended to be mated.

Another important object is the provision of such a device in which there are no removable parts which could become lost or mislaid; thereby affording assurance that the connection assembly is always ready for connection or disconnection without reference to any elements not directly associated therewith.

The foregoing and other objects are accomplished by means of the present invention of which, for illustrative purposes and without limiting the invention thereto, a single embodiment is disclosed in the following drawings in which—

Figure 1:
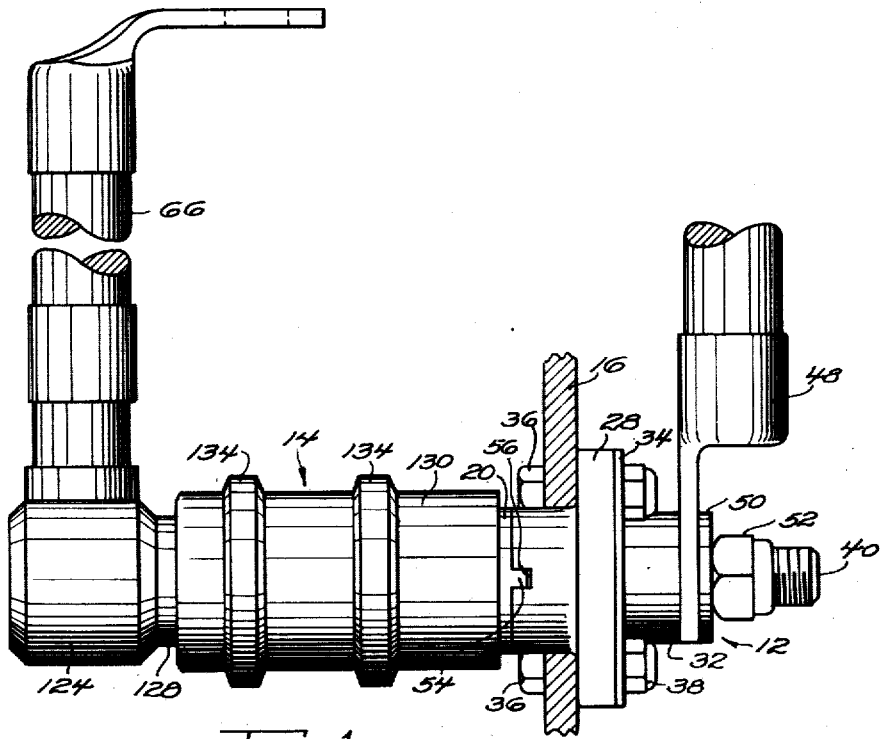
Figure 1 is an elevational view of a quickly disconnectable connecting device according to the present invention, including a fragmentary portion of a panel upon which one of two connection members is mounted.
Figure 2:
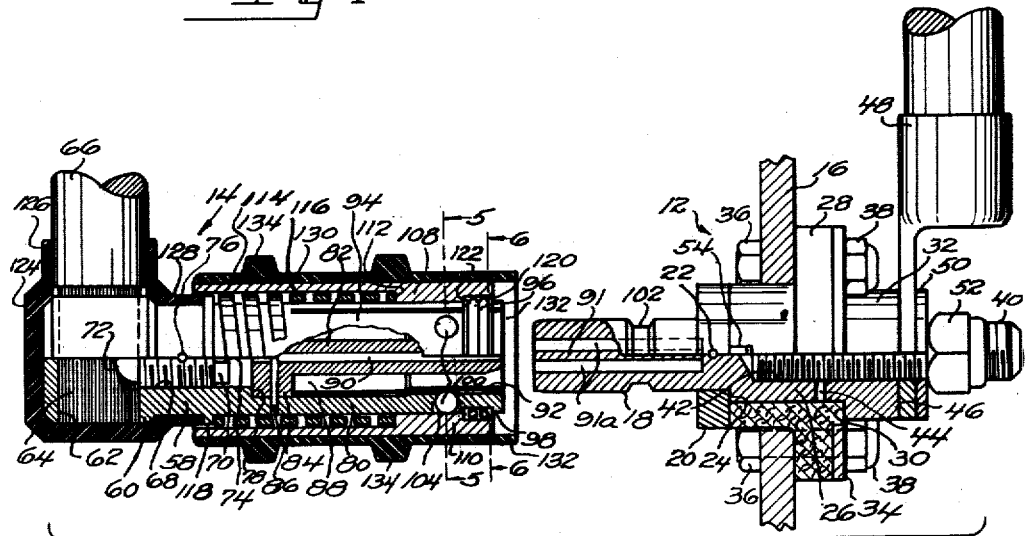
Fig. 2 is a view of the principal parts of the device in their fully disconnected condition, which view, for the most part, is in axial section but in the upper half of which some of the parts are shown in elevation.

As may best be understood from Fig. 2, a connecting device according to the present invention may comprise a male connection member generally indicated at 12 and a female connection member generally indicated at 14. The male connection member 12 preferably is mounted upon a panel, of which a fragmentary portion 16 is shown with the male connection member affixed thereto; but such panel mounting is not essential.

The male connection member 12 comprises a contact finger 18 having a metal washer 20 of fairly substantial thickness secured thereto by a dowel pin 22 which preferably extends radially completely through both the washer 20 and the contact member 18. This washer abuts against a shoulder 24 defining one end of an intermediate portion 26 of the contact finger of increased diameter.

Surrounding the intermediate portion 26 is a mounting flange 28, of suitable insulating material, held securely between the outer marginal portion of the washer 20, and a second shoulder 30 of the contact finger, which shoulder constitutes an inner face of a radial end flange 32 of said finger. The mounting flange 28 is preferably provided with a metal reinforcing plate 34 which is spaced from and insulated from all current conducting parts of the device; and plural bolts 36 with nuts 38 are employed in a well understood manner to firmly secure the mounting flange 28 and, with it, the entire male connection member 12 to the panel 16.

A stud bolt 40 is threaded into a threaded axial bore 42 formed in the radial flange end of the contact finger 18 and extending within the enlarged intermediate portion of said finger; and the said stud bolt is preferably firmly held therein by a suitable jam pin or set screw 44 which extends radially inwardly from the exterior of the intermediate portion 26 of the contact finger and into jamming association with the thread of the bolt 40. The outer end face 46 of the flange 32 affords a substantial contact surface for engagement with a cable lug 48 which is firmly held between said face and a metal washer 50 by a nut 52.

The metal washer 20 preferably is formed with one or more axially extending tongues 54 which seat within complemental grooves or recesses 56 in the mounting flange 28, thereby preventing rotation of any of the parts of the male connection member 12 relatively to the panel 16.

The principal part of the female connection member 14 is a current conducting sleeve 58, preferably of tellurium copper or other highly conductive metal which sleeve, as disclosed in the drawing, is formed with an enlarged end portion 60 having a lateral bore 62 therein of suitable diameter for receiving, with a fairly close fit, a stripped end 64 of a cable 66, the main portion of which preferably is insulated. Communicating with the lateral bore 62 is a threaded axial bore 68 in the conducting sleeve and into the bore 68 is threaded a set screw 70 formed with a semi-spherical end portion 72 at one end and a slot 74 at its other end.

Before association of other parts, hereinafter described, with the current conducting sleeve 58, the set screw 70 may be inserted from the open right end of said sleeve (as viewed in Fig. 2) and by means of a screw-driver, or other equivalent tool, inserted in the slot 74, the set screw 70 may be driven leftwardly to embed the semi-spherical end portion 72 of the set screw into the stripped end 64 of the cable, thereby securing the latter firmly to the current conducting sleeve. A dowel pin or set screw 76 or other suitable means is preferably employed to lock the set screw 70 firmly against unintentional loosening.

The threaded bore 68, at its end remote from the bore 62, terminates at an outwardly extending shoulder 78 within the conducting sleeve 58. From the shoulder 78 to the free end of the conducting sleeve, which is the right end as viewed in Fig. 2, said sleeve is in the form of a tube 80 having a wall of substantially uniform thickness from one end to the other thereof. Within the tube 80 is a tubular index element 82 having a flange 84 which is seated firmly against the shoulder 78 and held thus seated by a dowel pin 86 which extends radially through bores in the flange 84 and in the wall of the tube 80. The ends of the dowel pin are preferably upset to prevent displacement thereof.

The tubular, free end portion of the index element 82 preferably extends to the free end of the tube 80 and is of lesser outer diameter than the inner diameter of the latter, thereby affording an annular space 88 between the two. The index element 82 also is illustrated as formed with a longitudinal passage or bore 90 which may be circular in cross-sectional configuration to receive therewithin an indexing pin 91 of substantially complemental cross-sectional size and configuration, formed as an integral part of the contact finger 18, within an annular recess 91a in the left end of the latter, as it appears in the drawings. The provision of such complemental interfitting portions, only on cable connection members intended to be mated, assures against mismating of connection members, which might lead to undesirable results. The bore 90 and pin 91 may be of other complemental cross-sectional configurations, and, likewise, the inner surface of the outer cylindrical wall of the recess 91a of the contact finger 18 and the outer surface of the tubular, free end of the index element 82 may be complemental, thereby permitting the provision of different mating configurations for each of many pairs of connection members.

Figure 5:
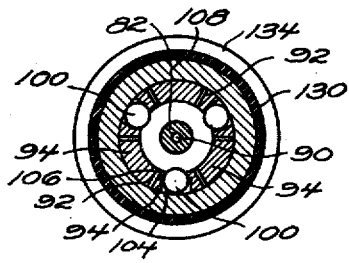
Fig. 5 is a cross-sectional view of one connection member substantially on the line 5—5 of Fig. 2.
Figure 6:
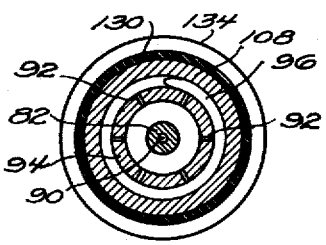
Fig. 6 is a cross-sectional view of the same connection member substantially on the line 6—6 of Fig. 2.

As best seen in Figs. 5 and 6, longitudinally extending radial cuts or slits 92 are cut or otherwise formed in the tube 80 and extend from the free right-hand end of said tube, as it appears in Fig. 2, preferably to the right-hand face of the flange 84 of the index element, the said cuts dividing the free end of the tube 80 into plural longitudinally extending contact fingers 94. A contractile coil spring 96 encircles the fingers 94 toward their free ends, and is preferably disposed within an annular groove 98 in said fingers, the contractile force of the spring holding it within the mentioned groove against unintended displacement. The spring 96 normally urges the free ends of the fingers 94 radially inwardly and also yieldably restrains outward flexing of said fingers. Thus, despite the fact that the sleeve 58 including its fingers 94 is preferably formed of tellurium copper which, while highly conductive, is nevertheless of relatively low tensile strength and of low resiliency, the spring 96, by preventing excessive outward flexing of said fingers, safeguards them against breakage and assures that they will always flex inwardly to the extent desired.

Figure 4:
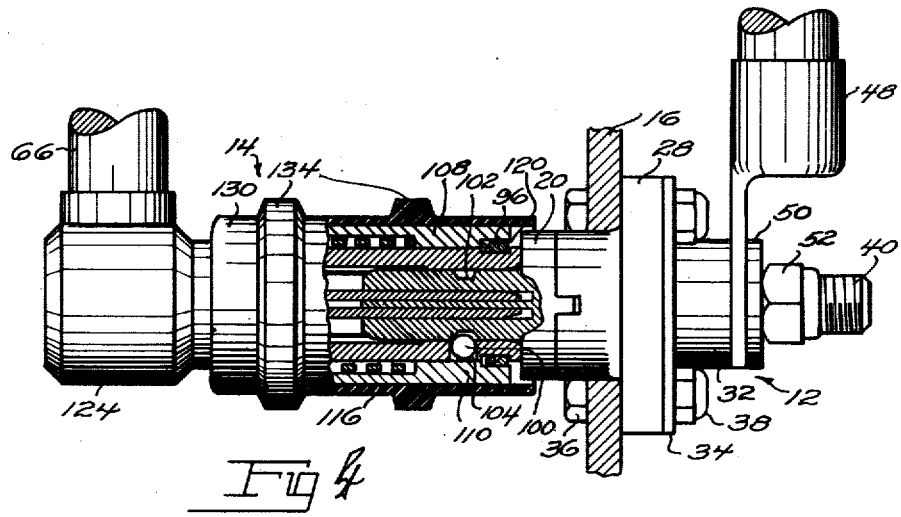
Fig. 4 is a view substantially like that of Fig. 3 with the parts shown, however, in fully connected condition.

Means are provided for releasably locking the contact finger 18 in telescoping relationship within the fingers 94, the mentioned locking means, as illustrated, consisting of a plurality of balls 100 associated with a plurality of the said fingers and arranged to seat releasably within an annular groove 102 in the contact finger. These balls are disposed within apertures 104 in several of the fingers 94, and the said apertures preferably are formed with an internal annular shoulder defining an inner aperture portion 106 which is of lesser diameter than the ball. The balls 100, apertures 104, and the fingers 94 are so proportioned that when a ball is inserted in an aperture from the outer side of the finger, the inner aperture portion 106 limits the radially inward movement of the ball to its position, as shown in Figs. 2 and 4, wherein the radially outermost surface of the ball is in axial alignment with the outer surface of the finger 94 and the innermost radial surface of the ball protrudes beyond the inner surface of the said finger and to a substantial extent into the groove 102 in the contact finger 18.

A metal manually slidable locking sleeve 108 extends about the conducting sleeve 58. The sleeve 108 has a locking portion 110 which fits with a close but nevertheless sliding fit over the fingers 94 and normally overlies the apertures 104 and the balls 100 carried therein to hold the balls in locking position. The locking sleeve 108 is formed with an internal shoulder 112 from which extends an integral cylindrical extension 114 which completely encircles and covers a helical compression coil spring 116.

The spring 116 extends around the tube 80 with one of its ends seated against the shoulder 112 and its other end seated against a radial flange 118 formed upon the exterior of the conducting sleeve 58 to urge the locking sleeve normally rightwardly as viewed in the drawings. The locking sleeve 108 has a short counter-bore 120 at its free end terminating in a shoulder 122 which extends from the inner surface of the counter-bore 120 to the inner cylindrical surface of the locking portion 110 of the locking sleeve. The outer diameter of the spring 96 is greater than the inner diameter of the locking portion 110, but slightly less than the inner diameter of the counter-bore 120.

In assembling the female connection member 14, the spring 116 is first slid over the free end of the conducting sleeve 58 into engagement with the radial flange 118 of the latter; then the balls 100 are placed and held in their respective apertures 104 while the locking sleeve 108 is slid over the free end of the conducting sleeve to bring the internal shoulder 112 of the locking sleeve into engagement with the end of the spring 116. Then the locking sleeve 108 is urged leftwardly against the compression of the spring 116 so that no portion of the locking sleeve overlies the groove 98 in the current conducting sleeve. With the parts in that position the contractile spring 96 may be spread open somewhat, slid over the free end of the conducting sleeve, and snapped into the groove 98. Then, when the locking sleeve 108 is released, the compressive force of the spring 116 urges the locking sleeve rightwardly to a point at which its interior shoulder 122 abuts the inner coil of the spring 96 which limits further rightward movement of the locking sleeve and retains that sleeve positively in its association with the other parts of the device.

A jacket 124 of rubber or other suitable insulating material is preferably molded upon the enlarged end portion 60 of the current conducting sleeve and this jacket preferably is formed with a sleeve 126, which may overlap and surround the end portion of the insulation of the cable 66, and the said jacket also preferably is formed with a second sleeve 128 which extends to the radial flange 118 of the current conducting sleeve and partly underlies the extension 114 of the locking sleeve.

A jacket 130 of rubber or other suitable insulating material is preferably molded and bonded upon the locking sleeve 108. This jacket preferably completely covers the locking sleeve and extends completely from the left end thereof as viewed in Fig. 2 substantially beyond the right end of said locking sleeve to provide an overhang 132 which normally projects beyond the free end of the current conducting sleeve 58 to protect the latter from damage when disconnected. The jacket 130 preferably is formed with a pair of annular beads or flanges 134 to serve as a finger grip to facilitate manual sliding of the locking sleeve.

Figure 3:
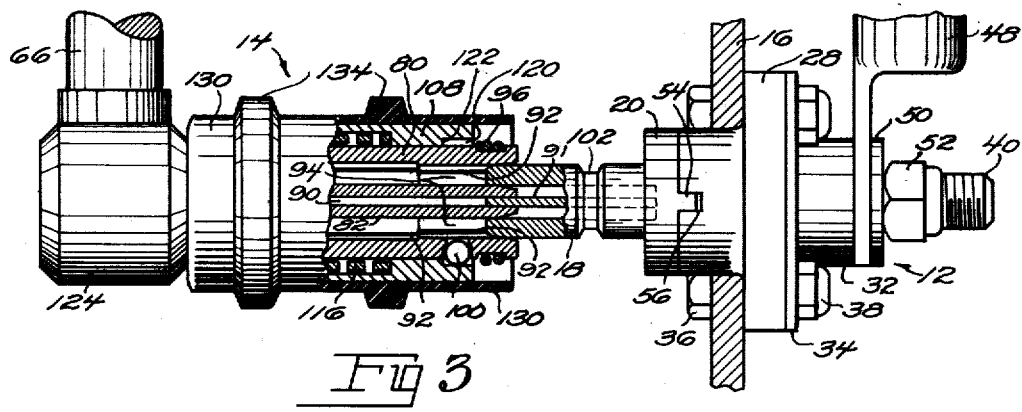
Fig. 3 is a view of the device largely in elevation but partly in central axial section, the parts being shown in their positions as during a first step in establishing connection between two connection members.

The operation of the device may best be understood from Figs. 2–4, inclusive. Assuming that the connection members 12 and 14 are separated, the male connection member 12 fixedly mounted upon the panel 16, and the parts of the female connection member 14 in their positions as shown in Fig. 2, the first step in assembling the two connection members is to grasp the female connection member 14, preferably with the jacket 124 in the palm of the hand and with two fingers of that hand at opposite sides of the jacket 130 and overlying one or the other of the beads or flanges 134. Then, by a squeezing motion of the hand the locking sleeve 108 is moved leftwardly as and to the extent indicated in Fig. 3 in which condition the balls 100 are free to move radially into the counter-bore 120, thus leaving the interior of the tube 80, and more particularly the inner surfaces of the fingers 94 constituting that tube, entirely clear for reception therewithin of the contact finger 18.

While the user holds the locking sleeve in its leftward position as shown in Fig. 3, the female connection member 14 is pushed completely onto the contact finger 18, after which the user releases the locking sleeve 108 from his grasp, whereupon it slides rightwardly under the force of the compression spring 116, bringing the parts to their positions shown in Fig. 4, wherein the locking portion 110 of the locking sleeve is in a position surrounding the several balls 100, thereby holding the latter firmly in their respective apertures 104 with the inner surfaces of said balls seated within the groove 102. In this condition of the apparatus, the male and female members cannot be separated because of the interlocking effect of the balls within the groove 102.

A very convenient feature inherent in this structure resides in the fact that although the several parts are firmly interlocked in their connected conditions, nevertheless a single simple movement suffices to release and separate the parts to effect a complete disconnection of the connected cable elements. Thus, with the parts in their connected positions as shown in Fig 4, one need only grasp the jacket 130 at one or both of the beads 134 and pull that jacket and with it the locking sleeve 108 leftwardly as viewed in the drawing. In actual operation a person performing this leftward movement would really be pulling the mentioned jacket and sleeve toward himself.

The described leftward or pulling movement brings the jacket 130 and the locking sleeve 108 back to their positions as shown in Fig. 3, thus unlocking the balls 100 so that continuation of the same movement in the same direction serves to pull the female member from its position over the male member. During this movement, as the depth of the groove 102 is less than the radius of the ball 100, a side wall of said groove pushes the balls 100 laterally outwardly into the then radially-aligned counter-bore 120 of the locking sleeve so that they no longer have any locking association with said groove.

It may be understood from the foregoing that a connecting device according to the present invention affords a very effective locked, swiveling connection between cable members and that while the contact maintained between those members is a positive contact which results in efficient conduction, the connected cable members may be quickly disconnected by a single pull exerted upon one of those members in one direction. It should also be obvious from the foregoing description that connecting devices according to this invention accomplish very effectively all the objects hereinbefore set forth.

It should also be observed that only one illustrative form of the invention has been disclosed and described herein and that, although in the foregoing specification certain alternative structures have been suggested, nevertheless those suggestions have been made without in any way limiting the invention thereto. On the contrary, it should be obvious that a connecting device according to the present inventive concept may involve numerous modifications of variations without departing from the invention as defined in the following claims.

What we claim is:

1. A cable connection comprising a sleeve-like female connection member adapted for electrically-conductive association with a cable portion, a stud-like male connection member adapted for electrically-conductive association with another cable portion and proportioned to telescope into said female member with a close electrically-conductive contact therewith, an aperture in the wall of said female member, an exterior annular recess in said male member, the said aperture and recess being so located in their respective members as to be in radial alignment when the two members are substantially intertelescoped, a non-deformable locking element, in said aperture, of a radial diameter greater than the thickness of the wall of the female member at said aperture, a slidable locking sleeve extending about said female member and having a locking portion which, in one position of the locking sleeve, closely overlies said aperture to hold said locking element in a radially innermost position wherein it extends within said recess in the male member when the connection members are telescoped, to prevent untelescoping thereof, and said locking sleeve having a release portion which, in another position to which the locking sleeve may be slid, overlies said aperture in radially spaced relation thereto in which said locking element is free to move radially outwardly to withdraw from said recess and thereby permit untelescoping of the two connection members.

2. A cable connection according to claim 1, the said female member comprising plural resilient fingers at least one of which is formed to have such an aperture, the said locking element being a ball in said aperture, the said locking sleeve having a counterbore toward one end constituting said release portion, an intermediate annular portion constituting said locking portion and a shoulder between the said release and locking portions, the said fingers having external grooves constituting a circumferential groove in said female member intermediate the free end thereof and the said aperture therein, a contractile spring in said circumferential groove tending to urge said fingers radially inwardly, and constituting an abutment coacting with said shoulder to limit axial movement of said sleeve toward the free ends of said fingers, and resilient means, within said sleeve and toward the end thereof remote from said release portion, coacting with the female connection member and with said sleeve to urge the latter toward its mentioned limit of movement.

JOHN WALLEN ANDERSON.
JEAN WILLARD HAMILTON.

REFERENCES CITED

The following references are of record in the file of this patent:

UNITED STATES PATENTS

| Number | Name | Date |
|---|---|---|
| 1,602,708 | Russell | Oct. 12, 1926 |
| 1,667,485 | Macdonald | Apr. 24, 1928 |
| 1,927,267 | James | Sept. 19, 1933 |
| 2,049,749 | Roth | Aug. 4, 1936 |
| 2,346,831 | Drury | Apr. 18, 1944 |
| 2,409,650 | Wiggins | Oct. 22, 1946 |

FOREIGN PATENTS

| Number | Country | Date |
|---|---|---|
| 433,622 | England | Aug. 19, 1935 |
| 591,068 | England | Aug. 6, 1947 |

Certificate of Correction

Patent No. 2,574,456                                                  November 13, 1951

JOHN WALLEN ANDERSON ET AL.

It is hereby certified that error appears in the printed specification of the above numbered patent requiring correction as follows:

Column 8, list of references cited, under the heading "UNITED STATES PATENTS" add the following:

1,266,441      Finkelstein _____ May 14, 1918 and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*